Dec. 19, 1939.  C. A. HEILAND  2,183,934
MULTIPLE GALVANOMETER
Filed June 4, 1937  2 Sheets-Sheet 2
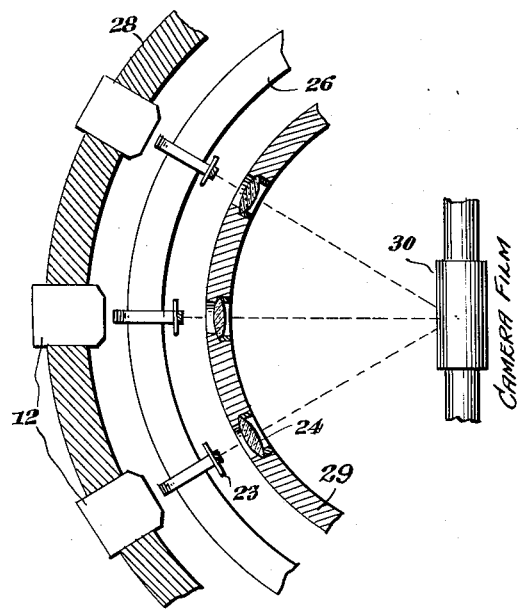
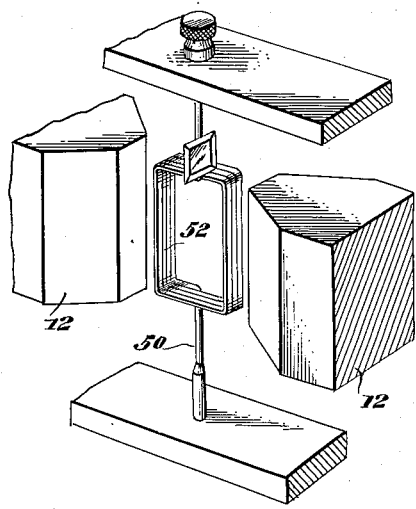
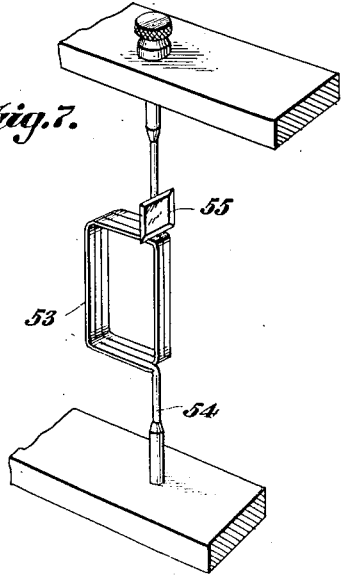
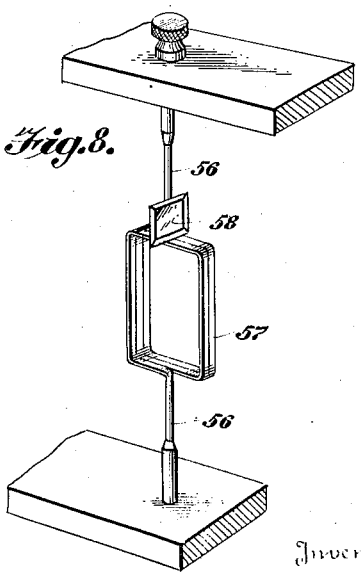
Inventor
C. A. HEILAND
Attorney Patented Dec. 19, 1939

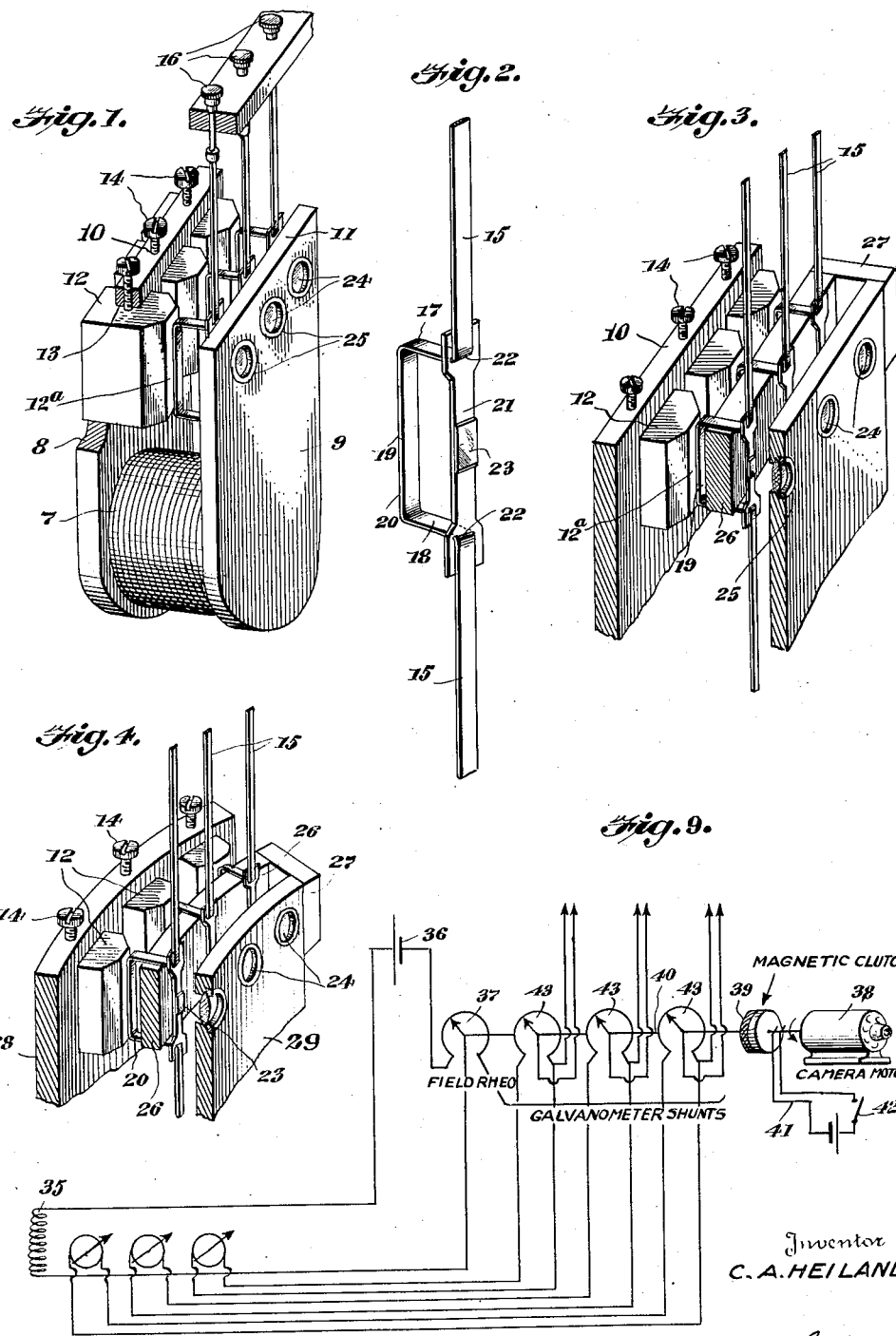

2,183,934

UNITED STATES PATENT OFFICE 2,183,934

MULTIPLE GALVANOMETER

Carl A. Heiland, Denver, Colo., assignor to Heiland Research Corporation, Denver, Colo., a corporation of Colorado Application June 4, 1937, Serial No. 146,521

13 Claims. (Cl. 171—95)

The present invention relates to galvanometers, and more particularly to multiple galvanometers in which a plurality of movable members are used to indicate fluctuations of different electric currents.

Multiple galvanometers have a very wide field of use. For example in geophysical work, it is often desirable to observe or record on one scale or film various electrical parameters indicative of a phenomenon at a point of observation or identical electrical parameters of the same phenomenon but at different points of observation. In the measurement of gravity by means of pendulums, it is important to compare the oscillations of different field pendulums with those of a reference pendulum. This may be accomplished by transforming by photo-electric means, the oscillations into electrical impulses and transmitting the electrical impulses to a central station where comparison may be made with a reference pendulum. Such comparison becomes very accurate when the electrical impulses resulting from the oscillations of the different pendulums are recorded on a single film by means of galvanometers operated from the different pendulums. Similarly pendulum oscillations may be compared with time signals transmitted by radio from an observatory.

In electrical prospecting, field observations may be made in a relatively simple manner by simultaneously observing various electrical parameters at one station. Comparisons in this field may be very accurately made by recording the received impulses from various receiving stations upon a single film.

A further use for multiple galvanometers is in the investigation of the upper atmosphere by skip distance observation, either by recording the intensity and travel time of explosion generated sound at various stations, or by comparing records of received impulses from electrical transmission by a central station.

In all of these, the ideal procedure is to transmit the impulses from the observation or pickup points to a central station, and to there record them simultaneously on a single film and compare them with each other and with a standard.

In the ideal multiple galvanometer, satisfactory for field work, there are five requirements to be met:—
1. Small width of assembly,
2. Fairly high frequency of units,
3. Effective electro-magnetic damping,
4. High sensitivity,
5. Small size of magnet.

The present invention is designed to meet all of the requirements as far as possible.

One object of the present invention is to provide a novel form of multiple galvanometer, the arrangement of which permits a great reduction in size and weight in comparison to galvanometers of this type previously used.

Another object is to provide a galvanometer having novel means for providing a plurality of magnetic fields of relatively great intensity, together with reduction in the size and weight of the magnet.

Another object of the invention is to provide a novel form of movable coil for galvanometers.

Still another object is to provide a novel method of mounting a mirror upon the galvanometer coils.

A still further object is to provide a novel form of magnet for use with multiple galvanometers.

Still another object is to provide a novel form of multiple galvanometer in which the reflected light beams are directed to points in close proximity to each other to permit a large number of records to be made upon a single film that is not of undue width.

Still another object is to provide novel means for controlling a series of galvanometers, whereby the sensitivity of the instruments may be controlled in a predetermined manner.

In the accompanying drawings:

Figure 1 is a perspective view of one embodiment of the invention.

Figure 2 is a perspective view of one of the coil elements.

Figure 3 is a perspective cut-away view showing a modification.

Figure 4 is a view similar to Figure 3, showing a modified form of the embodiment shown in Figure 3.

Figure 5 is a top sectional view showing diagrammatically the form shown in Figure 4.

Figures 6, 7 and 8 are perspective views of a modified form of movable element.

Figure 9 is a diagram, showing a system in which the invention may be used, and wherein the efficiency of the galvanometer is automatically increased in proportion to the time elapsed.

Referring to the drawings more particularly, and to the embodiment shown in Figure 1, an electro-magnet is shown at 7 of a modified horseshoe type, and having arms 8 and 9 that terminate respectively in relatively wide magnetic pole members 10 and 11 of opposite polarity. The particular galvanometer being described has three units, it being understood that these may be multiplied to any desired reasonable number. In order to provide for a plurality of units, magnetic fields equal in number to the number of units, are created. As distinguished from prior multiple galvanometers, in which the fields have been in series between two magnetic poles, these magnetic fields are parallel to each other instead of in series.

A series of spaced parallel pole pieces of magnetic material is arranged on the arm 8, one pole piece being at each point where a magnetic field is to be created. The pole pieces extend toward the opposite pole 11 and preferably they are, as shown in Figure 1, slidably mounted in apertures 13 in the arm 8, so that the gap between their ends and the pole 11 may be adjusted. Suitable holding devices, as set screws 14, may be provided. It will be apparent from a consideration of Figure 1 that between each of the pole pieces 12 and the pole 11 of the arm 9, a magnetic field exists. Preferably the pole pieces have narrow faces 12a in order that the magnetic field be concentrated adjacent them. The concentrated surface of each pole piece and the wide pole 11 of the opposite arm create an asymmetrical field spreading from the surface of the pole piece, and therefore diminishing in intensity toward the pole 11. In each of the magnetic fields an electric field-creating device is rotatably suspended.

A special type of movable element is preferably used with the magnet assembly above described. The preferred embodiment is illustrated in detail in Figure 2, and comprises a ribbon 15 of conducting material, by means of which the element is suspended from a suspension head 16 shown in Figure 1. The ribbon extends vertically between the arms 8 and 9 of the magnet, and at a point between its ends, and located to occupy a position in the magnetic field between a pole piece 12 and the pole 11, a field-creating structure of specialized form is provided. This structure is made by rebending the ribbon 15 to form spaced upper and lower arms 17 and 18 respectively, that extend to one side of the ribbon at right angles thereto, and a portion 19 at right angles to the arms 17 and 18 and substantially parallel to the axis of the ribbon. The rebent portions of the ribbon 17, 18 and 19 form a field-creating structure 20 that is equivalent to a coil of one-half turn, having an open side in continuation of the plane of the ribbon.

The structure 20, being open-sided in the plane of the ribbon 15, is asymmetrical, and the field created thereby is asymmetrical as compared to that created by a coil of complete turns.

A strip 21, having perforations 22 for receiving the ribbon is threaded upon the ribbon in a manner to bridge the open side of the structure 20, with the bend of the ribbon engaged in the perforations 22. The strip 21, besides functioning as a spacer for the arms 17 and 18, is used as a support for a mirror 23, the back of which is secured to the strip, and the plane of which is arranged at right angles to a plane passing through the centers of the sides 17, 18 and 19 of the field-creating structure.

The flat form of ribbon 15 is preferable over a round wire, in that in a ribbon, the ratio of conductance and torsional coefficient is greater than that in wire, with a resulting greater sensitivity and damping effect present in a ribbon supported element. The weight of the strip 21 and the mirror 23 carried by it are so adjusted that the moment of inertia of the strip and mirror is greater than the moment of inertia of the eccentrically extending field-creating structure 20. This results in the motion of the structure 20 being truly rotational about the vertical axis of the strip 21 which is in continuation of the axis of the ribbon. The torsional coefficient of the ribbon is so adjusted that rotation is confined to the vertical axis of the ribbon, this confining the motion of the structure 20 to a time rotation without lateral displacement. These careful adjustments of torsional coefficient and moments of inertia result in a movable element of a sensitivity of from one to several micro-amperes per millimeter scale deflection at one-half meter reading distance.

The movable elements are so suspended that the ribbon is adjacent the arm 10 and the structure 20 extends transversely of the space between the arms 8 and 9, toward the pole pieces 12. Inasmuch as the magnetic fields extend in a gradually spreading manner with their intensities decreasing in proportion to the distance from the surface of the pole pieces, it is apparent that the portion 19 of the field-creating structure 20 cuts that portion of the field which is more intense than the portion cut by any other portion of the structure, and that the open side of the structure rotates in a portion of the field of relatively small intensity.

This arrangement of an asymmetric movable field-creating structure in an asymmetric magnetic field whereby the movement of the structure is effected at a point spaced from the pole 11, also permits the arm 9 to be made of relatively thin material and to be provided with light openings 24. Lenses 25 may be mounted in the openings 24 to concentrate light beams reflected by the mirrors upon a visual scale or recording film.

In Figure 3 a further development of the invention is illustrated. In this embodiment the structure is similar to that illustrated in Figure 1, but with additional means for concentrating the magnetic field around the swinging portion 19 of the field-creating structure. Upon the arm 9, which is opposite to that bearing the pole pieces, is mounted an auxiliary magnetic pole member 26, supported by a bracket 27 attached to the edge of the arm 9 and extending toward the arm 8. The member 26 is in the form of a bar that extends horizontally between the arms 8 and 9 and which passes through the structure 20 of the movable elements. The bar 26 acts as a pole of the arm 9, and being of opposite polarity to the pole 8, and therefore the pole pieces 12, it forms more concentrated fields between itself and the inner surfaces 12a of the pole pieces 12, these concentrated fields being cut by the portions 19 of the field-creating structure 20.

In Figures 4 and 5, an adaptation is illustrated, by means of which a large number of records may be made upon a single film. In this embodiment the arms 28 and 29, corresponding respectively to the arms 8 and 9 of the embodiment of Figure 1, are arcuate in form, the arcs on which they are arranged having a common center. The field-creating structure 20 is suspended in a fan-like manner upon radii of the outer arc so that light beams reflected by the mirrors 23 will converge towards the common center of the arcs. A sensitized film 30 is disposed in a position to receive all of the beams, the distance of the film from the arm 29 being calculated to bring the beams from all of the movable elements within the width of the film.

It will be understood that the element 26 and the field-creating devices 20 of Figures 3, 4 and 5 are so related in size that the structures 20 are free to rotate within the narrow limits necessary to perform their function without striking the members 26.

In Figures 6, 7 and 8 are illustrated other forms of movable elements that may be used instead of that illustrated in Figure 2. These elements are adaptations that are designed for use where a higher magnetic force is desirable, and instead of an open-sided structure, they comprise coils of a number of turns.

In Figure 6 the element comprises a suspension strand 50 of conducting material. The strand is wound between its ends to form a coil 52 that is symmetrically disposed upon the axis of the strand 50. Inasmuch as the element is for use in a multiple galvanometer where the magnets are parallel, the mirror is arranged to face toward one side of the assembly and its surface is disposed in a plane at right angles to the plane of the coil. In this embodiment the galvanometer is provided with a pole piece upon each side of the coil, to provide a symmetrical field, and the mirror is mounted upon the top of the coil so that the light beam may avoid striking the pole piece.

Figure 7 illustrates a form of movable element in which an unbalanced coil is used. This form of device is intended for use with a structure as disclosed in Figure 1, 3 or 4, and comprises a coil 53 wound entirely to one side of the axis of the supporting strand 54. In order to balance the coil 53 the mirror 55 is mounted upon the side of the strand opposite to the coil, and the weight of the mirror may be selected in relation to the distance of its center of gravity from the axis of the strand so that the weight of the total assembly will be symmetrically distributed upon the strand 54 to enable it to rotate efficiently.

The structure of Figure 8 discloses a method of balancing an asymmetrically wound coil that extends upon opposite sides of the supporting strand. In this form the supporting strand 56 is wound into a coil 57 in such a manner that the half that extends upon one side of the strand has one more turn than that upon the other side. In this case the mirror 58 is mounted upon the side of the strand 56 from which extends the half of the coil that has the fewer number of turns and the weight of the mirror is adjusted to counteract the effect of the weight of the extra turn on the opposite side of the strand so that the weight of the assembly is equally distributed from opposite sides of the strand.

In these three embodiments, illustrated in Figures 6, 7 and 8, the mirrors may be cemented to the strands 50, 54 and 56, respectively and have their lower edges cemented to the top surfaces of the coils.

The elements in the above described multiple galvanometer are preferably connected to the output circuits of the pick-up devices by means of variable resistance shunts. Preferably also, where an electro-magnet is used, the magnetic field-creating coil is controlled by a variable resistance. By a proper selection of the shunt and field resistances, critical or any other desired damping rate may be obtained.

In the recording of certain rapidly changing phenomena, particularly in the field of geophysical exploration where the intensities of the impulses, whether electrical or mechanical, vary widely in proportion to the length of the path traversed by the impulse, and are received at short intervals of time, the efficiency of the galvanometers used is very much greater and better records may be made if the galvanometer sensitivity is automatically increased in proportion to the lapse of time.

In Figure 9, a system is illustrated in which the galvanometer field is provided by an electro-magnet and in which provision is made for automatically varying the sensitivity of the galvanometers without sacrificing the critical damping effect. In this system the field coil 35 is supplied with current from a source 36 through a circuit interrupted by a rheostat illustrated diagrammatically at 37. The motor 38, by means of which the record film is driven, drives through a magnetic clutch 39, a cam shaft 40 diagrammatically illustrated, the cam shaft 40 operating the rheostat 37. The magnetic clutch 39 is operated by a circuit 41 having therein a switch 42 that may be controlled by any desirable time mechanism. During the operation of recording a series of impulses, the motor 38 is constantly running, and at suitable intervals the switch 42 is closed, coupling the shaft 40 to the motor 38 through the clutch 39 for a predetermined short interval of time, the coupling operation resulting in the variation of the rheostat 37 to increase the current flow to the field coil 35 and thereby increasing the sensitivity of the movable galvanometer elements.

In order to maintain the damping of the movable elements at a constant value, while the field coil current is varied, the galvanometer inputs are connected with the movable elements respectively through variable resistance shunts 43. The operation of these shunts depends upon the operation of the cam shaft 40, to which the movable elements of the shunts are connected. It will be clearly apparent that in this manner the currents shunted through the movable elements of the galvanometers are varied at the instant that the field coil current is varied, this resulting in a proper relative variation of the currents whereby sensitivity and damping remain at a constant relation to each other while the sensitivity of the galvanometer as a single instrument increases at timed intervals due to the progressive rotation of the shaft 40. It will be understood of course that each movable element of the galvanometer is connected through a shunt, the diagram in Figure 9 being suitable for use with a three element galvanometer as illustrated in Figures 1, 3 and 4.

From the foregoing, it is thought that the construction, operation and many advantages of the hereindescribed invention will be apparent to those skilled in the art without further description, and it will be understood that various changes in the size, shape, proportion and minor details of construction may be resorted to without departing from the spirit or sacrificing any of the advantages of the invention.

What I claim is:

1. A movable element for galvanometers comprising a suspension strand of conducting material having between its ends a rebent portion extending to one side of the strand, a non-conducting strip carried by the strand and bridging the open side of the rebent portion, and a mirror mounted on the non-conducting strip.

2. A movable element for galvanometers comprising a suspension strand of conducting material having between its ends a coiled portion extending to one side of the strand substantially in a plane, and a mirror supported by the strand and substantially in line with the axis thereof and extending along a plane at an angle to that of the coil.

3. In a galvanometer, a movable element comprising a ribbon of conducting material having between its ends a rebent portion extending to one side thereof, a non-conducting strip bridging the open side of the rebent portion substantially in line with the axis of the ribbon, the weight of the non-conducting strip being such that its moment of inertia is greater than the moment of inertia of the ribbon when moving in the field of the galvanometer.

4. A movable element structure for multiple galvanometers, the said element comprising a suspension strand having a coil comprising a plurality of turns extending to one side of the strand between its ends, and a mirror mounted upon the strand above the top of the coil upon the side of the strand opposite to that from which the coil extends.

5. A movable element for multiple galvanometers comprising a suspension strand, a coil intermediate the ends of the strand, the weight of the coil upon one side of the strand being less than that of the weight upon the other, and a mirror mounted upon the suspension strand on the side having the lesser weight, the surface of the said mirror being in a plane at right angles to the plane of the coil.

6. A galvanometer comprising a pair of magnetic pole members of opposite polarity, having an air-gap between them and arranged to create in the air-gap a magnetic field that increases in intensity toward one of the pole members, and an electric field-creating device suspended for oscillation in the air-gap, the said device being arranged to create an asymmetric electric field that increases in intensity from the point of oscillation of the device toward the pole member adjacent which the magnetic field is more intense.

7. A galvanometer comprising a pair of spaced magnetic pole members having relatively wide surfaces, a pole piece extending from a single one of the pole members toward the other, said pole piece having an end that is smaller than the surfaces of the pole members and that is separated from the surface of the pole member toward which it extends by an air-gap, and an electric field-creating device suspended for oscillation in the air-gap and arranged to create an asymmetric electric field that increases in intensity from the point of oscillation of the device toward the end of the pole piece.

8. A galvanometer comprising a pair of magnetic pole members of opposite polarity and having an air-gap between them, said pole pieces being arranged to create a magnetic field in the air-gap that increases in intensity toward one of the pole members, a strand traversing the air-gap and having an eccentric, electric field-creating rebent portion in the air-gap, the said rebent portion extending from the axis of the strand toward the pole member adjacent which the magnetic field is more intense.

9. A galvanometer comprising a pair of relatively wide magnetic pole members of opposite polarity, one of the said members having an opening therethrough, a strand passing between the pole members and opposite the opening, an electric field-creating structure mounted eccentrically on the strand and extending away from the pole member having the opening, and a mirror supported by the strand substantially upon the axis thereof and opposite the opening in the pole member.

10. A multiple galvanometer comprising a spaced pair of magnetic pole members of opposite polarity, one of the said members having a smooth inner surface and the other having a plurality of parallel pole pieces extending toward the smooth surface of the first pole member and being separated therefrom by air gaps, and an asymmetric electric field-creating device suspended for eccentric oscillation in each of the air gaps, the said devices being suspended so that such oscillation is toward the respective pole pieces.

11. A multiple galvanometer comprising spaced, relatively wide pole members of opposite polarity, a plurality of pole pieces mounted on a single one of the pole members and extending toward the surface of the other member and being separated therefrom by air-gaps, a strand traversing each of the air-gaps and having a rebent electric field-creating portion suspended eccentrically with respect to the axis of the strand, the rebent portions being arranged within the air-gaps and extending from the axes of the respective strands toward the respective pole pieces.

12. In a galvanometer comprising a pole member and a rebent electric field-creating strand suspended adjacent the said pole member, a second pole member of opposite polarity to the first and arranged to pass through the rebent field-creating strand.

13. In a galvanometer comprising a magnetic pole member having a plurality of parallel pole pieces extending therefrom, and a strand having a rebent electric field-creating portion suspended adjacent each of the pole pieces and arranged in planes that are substantially parallel to the axes of the pole pieces, a second pole member, of polarity opposite to that of the first pole member, the said second pole member being elongated in form and extending between the arms of the respective rebent field-creating devices.

CARL A. HEILAND.